(12) United States Patent
Brauer et al.

(10) Patent No.: US 10,452,934 B1
(45) Date of Patent: Oct. 22, 2019

(54) APPARATUS AND METHOD FOR PROVIDING ATTITUDE REFERENCE FOR VEHICLE PASSENGERS

(71) Applicant: B/E Aerospace, Inc., Wellington, FL (US)

(72) Inventors: R. Klaus Brauer, Seattle, WA (US); John Warren, Waterlooville (GB); Simon Robert Lee, Southampton (GB); Ian L. Frost, Winston-Salem, NC (US)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 15/993,310

(22) Filed: May 30, 2018

Related U.S. Application Data

(63) Continuation of application No. 15/382,633, filed on Dec. 17, 2016, now Pat. No. 10,089,544, which is a
(Continued)

(51) Int. Cl.
| | |
|---|---|
| *G06K 9/00* | (2006.01) |
| *G06F 3/00* | (2006.01) |
| *H04N 5/225* | (2006.01) |
| *H04N 5/232* | (2006.01) |
| *G06F 3/14* | (2006.01) |
| *H04N 7/18* | (2006.01) |
| *B64D 11/00* | (2006.01) |
| *G02B 1/11* | (2015.01) |

(Continued)

(52) U.S. Cl.
CPC ...... *G06K 9/00845* (2013.01); *B64D 11/0015* (2013.01); *G02B 1/11* (2013.01); *G06F 3/005* (2013.01); *G06F 3/013* (2013.01); *G06F 3/1446* (2013.01); *G06K 9/00791* (2013.01); *H04N 5/2253* (2013.01); *H04N 5/23219* (2013.01); *H04N 5/23293* (2013.01); *H04N 5/23296* (2013.01); *H04N 7/181* (2013.01); *G02B 27/0006* (2013.01)

(58) Field of Classification Search
None
See application file for complete search history.

(56) References Cited

U.S. PATENT DOCUMENTS

| | | | |
|---|---|---|---|
| 5,568,960 | A | 10/1996 | Oleson et al. |
| 5,611,503 | A | 3/1997 | Brauer |

(Continued)

FOREIGN PATENT DOCUMENTS

| | | | |
|---|---|---|---|
| CA | 2866844 | A1 | 9/2013 |
| CA | 2909429 | A1 | 12/2014 |

(Continued)

OTHER PUBLICATIONS

Office Action dated Oct. 31, 2018 for Chinese Applicaton No. 201580042425.1.
(Continued)

*Primary Examiner* — Rebecca A Volentine
(74) *Attorney, Agent, or Firm* — Donna P. Suchy

(57) ABSTRACT

A system. The system may include at least one monitor mounted on a wall panel. The wall panel may be within an interior of an aircraft. Each of the at least one monitor may be configured to mimic an aircraft window. Each of the at least one monitor may include a shade feature.

16 Claims, 13 Drawing Sheets

Related U.S. Application Data continuation-in-part of application No. 14/645,526, filed on Mar. 12, 2015, now Pat. No. 9,996,754.

(60) Provisional application No. 62/011,866, filed on Jun. 13, 2014.

(51) Int. Cl.
*G06F 3/01* (2006.01)
*G02B 27/00* (2006.01)

(56) References Cited

U.S. PATENT DOCUMENTS

| | | |
|---|---|---|
| 6,317,127 B1 | 11/2001 | Daily et al. |
| 7,088,310 B2 | 8/2006 | Sanford |
| 7,128,705 B2 | 10/2006 | Brendley et al. |
| 7,280,134 B1 | 10/2007 | Henderson et al. |
| 8,590,838 B2 | 11/2013 | Cook et al. |
| 8,932,905 B1 | 1/2015 | Safai |
| 9,187,178 B2 | 11/2015 | Round et al. |
| 9,193,465 B2 | 11/2015 | Udriste |
| 9,456,184 B2 | 9/2016 | Barrou et al. |
| 9,706,242 B2 | 7/2017 | Dame et al. |
| 9,787,948 B2 | 10/2017 | de Carvalho et al. |
| 9,864,559 B2 | 1/2018 | Sizelove |
| 9,996,754 B2 | 6/2018 | Brauer |
| 10,089,544 B2 | 10/2018 | Brauer |
| 10,118,545 B2 | 11/2018 | Garing et al. |
| 2002/0093564 A1 | 7/2002 | Israel |
| 2004/0217234 A1 | 11/2004 | Jones et al. |
| 2004/0217978 A1 | 11/2004 | Humphries |
| 2005/0099433 A1 | 5/2005 | Berson et al. |
| 2005/0211841 A1 | 9/2005 | Guard et al. |
| 2005/0278753 A1 | 12/2005 | Brady, Jr. et al. |
| 2008/0042012 A1* | 2/2008 | Callahan .............. B64C 1/1484 244/129.3 |
| 2008/0111832 A1 | 5/2008 | Emam et al. |
| 2008/0136839 A1 | 6/2008 | Franko et al. |
| 2010/0060739 A1 | 3/2010 | Salazar |
| 2010/0157063 A1 | 6/2010 | Basso et al. |
| 2010/0188506 A1 | 7/2010 | Dwyer et al. |
| 2012/0325962 A1 | 12/2012 | Barron |
| 2013/0161971 A1* | 6/2013 | Bugno .................. B60J 3/04 296/97.2 |
| 2013/0169807 A1 | 7/2013 | de Carvalho et al. |
| 2013/0248654 A1 | 9/2013 | Henshaw et al. |
| 2013/0248655 A1 | 9/2013 | Kroll et al. |
| 2014/0160285 A1 | 6/2014 | Barrou et al. |
| 2014/0173669 A1 | 6/2014 | Coto-Lopez |
| 2014/0248827 A1 | 9/2014 | Keleher et al. |
| 2015/0077337 A1 | 3/2015 | Coto-Lopez et al. |
| 2015/0138449 A1 | 5/2015 | Rawlinson et al. |
| 2015/0151725 A1* | 6/2015 | Clarke .................. B60W 30/00 701/28 |
| 2015/0363656 A1 | 12/2015 | Brauer |
| 2016/0325836 A1 | 11/2016 | Teo |
| 2017/0057660 A1* | 3/2017 | Badger .................. B64D 47/08 |
| 2017/0088267 A1 | 3/2017 | Dowty et al. |
| 2017/0094166 A1 | 3/2017 | Riedel |
| 2017/0098133 A1 | 4/2017 | Brauer |
| 2017/0240283 A1 | 8/2017 | Dowty |
| 2017/0259921 A1 | 9/2017 | Valdes De La Garza et al. |

FOREIGN PATENT DOCUMENTS

| | | |
|---|---|---|
| CN | 102156607 A | 8/2011 |
| EP | 0838787 A2 | 4/1998 |
| EP | 0913325 A1 | 5/1999 |
| EP | 3141480 A1 | 3/2017 |
| EP | 3148186 A1 | 3/2017 |
| EP | 2825458 B1 | 11/2018 |
| WO | 2016018731 A1 | 2/2016 |
| WO | 2017176811 A1 | 10/2017 |

OTHER PUBLICATIONS

International Search Report and Written Opinion dated May 21, 2015 for PCT/US2015/020075.

* cited by examiner

APPARATUS AND METHOD FOR PROVIDING ATTITUDE REFERENCE FOR VEHICLE PASSENGERS

CROSS-REFERENCE TO RELATED APPLICATIONS

This application claims priority to:

a) U.S. application Ser. No. 15/382,633 entitled "Apparatus and Method for Providing Attitude Reference for Vehicle Passengers" and filed Dec. 17, 2016, which claims priority to U.S. application Ser. No. 14/645,526 entitled "Apparatus and Method for Providing Attitude Reference for Vehicle Passengers" and filed Mar. 12, 2015, which claims priority to U.S. Provisional Application No. 62/011,866 filed on Jun. 13, 2014; and b) U.S. application Ser. No. 14/645,526 entitled "Apparatus and Method for Providing Attitude Reference for Vehicle Passengers" and filed Mar. 12, 2015, which claims priority to U.S. Provisional Application No. 62/011,866 filed on Jun. 13, 2014;

the contents of each of which are herein incorporated by reference in their entirety.

BACKGROUND

The present disclosure relates generally to the field of vehicular travel and more particularly to a video system which informs one or more passengers seated in an enclosed windowless suite in a vehicle of the vehicle's attitude and changes in vehicle attitude (e.g. pitching nose up or nose down, or yawing or rolling to the right or left). Such windowless suites are now found in luxury long haul aircraft cabin suites of commercial aircraft.

It has long been known that airline passengers seated in window seats report experiencing higher comfort levels than passengers in other cabin areas. See U.S. Pat. No. 5,611,503, particularly FIG. 4. While there may be several reasons for this higher reported comfort level, psychological studies have shown that enabling passengers to be correctly oriented in space is an important contributor to passenger comfort. While some passengers experience acute motion sickness when deprived of visual references informing them of changes in vehicle attitude, a majority of airline passengers experience only a somewhat diminished comfort, the origin of which is unknown to them, when experiencing properly-coordinated maneuvers of a commercial airplane without a visual reference informing them of changes in airplane attitude.

Forward looking and downward looking "landscape" cameras displaying images on a video screen generally forward of the passenger are well known. Static airplane mockups incorporating video screens in lieu of actual windows are also known. In this and similar known applications, a single image has been replicated on all screens on the same side of the mockup.

Forward looking landscape cameras do not provide a reliable attitude reference during takeoff maneuvers because the nose of the aircraft is quickly pointed skyward, leaving no observable horizon. As a result, the disappearance of the horizon as the airplane rotates on takeoff can be disorienting to passengers. Downward looking cameras also do not provide an intuitive attitude reference to the passengers. Furthermore, the video screen displaying these images serves a variety of information and entertainment purposes and is rarely turned to the camera mode, rendering it unlikely to relieve motion-oriented discomfort resulting from a cause unrecognized by the passenger.

While they have been used in static mockups in which motion oriented discomfort is not an issue, emulating a row of aircraft windows with video monitors has never been considered sufficiently attractive for use in an airplane to justify developing and flight testing such a system. For a typical airplane cabin with many occupants and many monitors emulating actual windows, no viable alternative has been found to repeating the same image on each monitor down the length of a side of the cabin. When an airplane is climbing, repeating the same image in each monitor along a row of windows presents the image of a level flight over a sawtooth landscape. Any such perceived attitude reference is ambiguous or confusing. When an airplane is rolling, monitors farther from the passenger subtend a smaller vertical field of view. Accordingly, to each individual passenger the rear of the airplane will appear to be rolling more quickly than the front of the airplane; an appearance more likely to induce motion sickness than alleviate it.

SUMMARY OF ILLUSTRATIVE EMBODIMENTS

A video system and method is provided for emulating a view through an aircraft window for a passenger in an interior passenger suite.

In an aspect, the present disclosure relates to a video system including a video capture assembly comprising at least one camera configured for mounting proximate the aircraft window, and at least one monitor mounted within the interior passenger suite on a wall panel substantially parallel to the direction of flight, where each monitor of the at least one monitor comprises a respective monitor position relative to a passenger seat, and each monitor corresponds to a particular camera of the at least one camera. Each camera of the at least one camera may be angled to capture the image data at a respective perspective view determined based in part upon a distance between the monitor position of the respective monitor of the at least one monitor and a passenger reference position corresponding to an estimated viewpoint of the passenger while seated in the passenger seat.

In an aspect, the present disclosure relates to a video system including a video capture assembly including at least one camera, and a glare shield including a respective viewing aperture for each camera of the at least one camera, where each camera is mounted behind the glare shield to capture image data of scenery visible through the aircraft window, and each camera is angled to capture the image data at a respective perspective view; and at least one monitor mounted within the interior passenger suite on a wall panel substantially parallel to the vehicle window and positioned between the vehicle window and a passenger seat, where each monitor includes a respective monitor position relative to the passenger seat, and each monitor corresponds to a particular camera.

In an aspect, the present disclosure relates to a video system where the glare shield comprises a respective anti-reflective mask for each camera of the at least one camera.

In an aspect, the present disclosure relates to a video system where a minimal boundary of the anti-reflective mask for each camera of the at least one camera is determined based on the perspective view of the respective camera.

In an aspect, the present disclosure relates to a video system where the anti-reflective mask comprises black paint applied to the glare shield.

In an aspect, the present disclosure relates to a video system where the glare shield comprises an aluminum pane.

In an aspect, the present disclosure relates to a video system where the glare shield includes a respective anti-reflective mask for each camera of the at least one camera, and a minimal boundary of the anti-reflective mask for each camera of the at least one camera is determined based on the perspective view of the respective camera and a distance between the respective video camera and a dual glass pane of the aircraft window.

In an aspect, the present disclosure relates to a video system where the dust cover is removed from the aircraft window while the video capture assembly is mounted in the aircraft window.

In an aspect, the present disclosure relates to a video system where the at least one monitor comprises three monitors.

In an aspect, the present disclosure relates to a video system where the passenger position is a default position based upon a position of a headrest of the passenger seat when the passenger seat is in an upright position.

In an aspect, the present disclosure relates to a video system including a sensor configured to detect the passenger position.

In an aspect, the present disclosure relates to a method for presenting a real-time view of exterior scenery of an aircraft to a passenger in an interior passenger suite.

In an aspect, the present disclosure relates to a method including determining a passenger reference position corresponding to an eye position of the passenger when seated in the interior passenger seat; determining a monitor position of each monitor of at least one monitor mounted on a side wall of the passenger suite; calculating a perspective view for each monitor of the at least one monitor based on a horizontal distance between the passenger reference position and the respective monitor position; for each monitor of the at least one monitor, setting a capture angle of a respective video camera relative to a window of the aircraft, where the capture angle corresponds to the perspective view; using at least one video camera, capturing video data through the window of the aircraft corresponding to the perspective view of each monitor of the at least one monitor; and for each monitor of the at least one monitor, providing the video data representing the respective view for display in the interior passenger suite in real time.

In an aspect, the present disclosure relates to a method including determining the passenger reference position includes determining an average position of eye level while seated in the passenger seat in a position required for taxi, takeoff, and landing.

In an aspect, the present disclosure relates to a method for presenting a real-time view of exterior scenery of an aircraft to a passenger in an interior passenger suite, including determining a passenger reference position corresponding to an eye position of the passenger when seated in the interior passenger seat, determining a horizontal distance between the passenger reference position and a respective monitor position of each monitor of at least one monitor mounted on a side wall of the passenger suite, for each monitor of the at least one monitor, calculating a perspective view based on the horizontal distance between the passenger reference position and the respective monitor position, for each monitor of the at least one monitor, setting a capture angle of a respective video camera relative to a window of the aircraft, wherein the capture angle corresponds to the respective perspective view, using at least one video camera, capturing video data through the window of the aircraft corresponding to the perspective view of each monitor of the at least one monitor, and for each monitor of the at least one monitor, providing the video data representing the respective view for display in the interior passenger suite in real time.

The method may include determining the passenger reference position includes determining an average position of eye level while seated in the passenger seat in a position required for taxi, takeoff, and landing. In an aspect, providing the video data representing the respective view for display may include providing video data captured by a first camera of the at least one camera to a first monitor of the at least one monitor via a first high speed data interface, and providing video data captured by a second camera of the at least one camera to a second monitor of the at least one monitor via a second high speed data interface. The at least one monitor may be dedicated to presenting video data captured by the at least one camera. Calculating the perspective view may include calculating a downward angle relative to a horizontal plane of a cabin area of the aircraft and a forward angle relative to a transverse plane of the cabin area of the aircraft. Calculating the perspective view may include calculating a field of view based on a distance between an upper edge of a display region of the respective monitor and a lower edge of the display region of the respective monitor. Each monitor of the at least one monitor may be mounted behind a partition such that only a portion of each monitor is visible to the passenger.

In one aspect, the method may include positioning a glare shield between the at least one camera and the window of the aircraft, the glare shield including at least one aperture for video capture, wherein the at least one aperture is at least partially surrounded on a window-facing surface by an antireflective mask. Positioning the glare shield may include connecting the glare shield to a first camera of the at least one camera.

In one aspect, the method may include correcting the video data for horizontal distortion. The at least one monitor may include at least two monitors arranged to emulate a sizing, a spacing, and a mounting height of aircraft windows.

BRIEF DESCRIPTION OF THE FIGURES

A more complete appreciation of the innovations and many of the attendant advantages thereof will be readily obtained as the same becomes better understood by reference to the following detailed description when considered in connection with the accompanying drawings, where.

DETAILED DESCRIPTION OF ILLUSTRATIVE EMBODIMENTS

Figure 1:
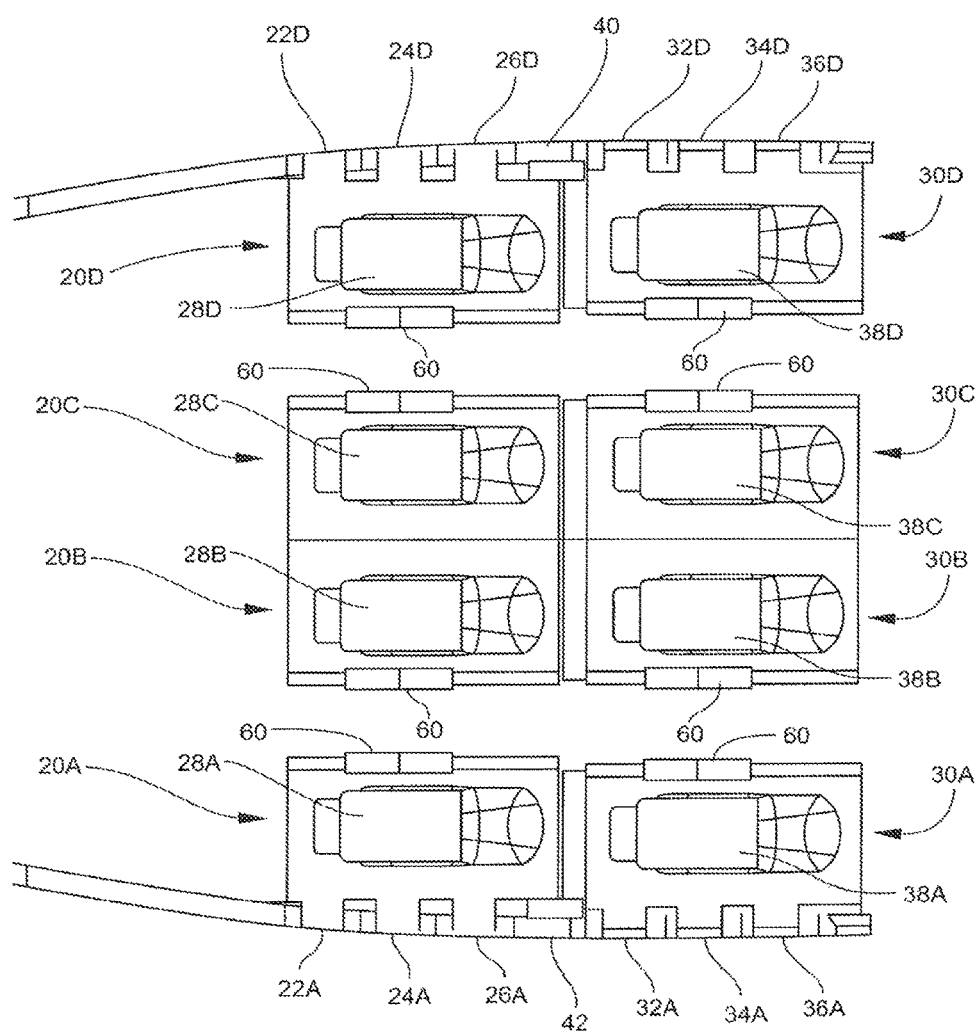
FIG. 1 is a plan view of a prior art aircraft interior having enclosed suites without access to direct visual attitude reference.

The present disclosure provides a video system for emulating a set of actual windows to a passenger in an enclosed suite, compartment or cabin in an aircraft, ship or other vehicle, where motion can induce motion sickness or motion-related discomfort. The video system can include a video capture assembly configured to capture images of one or more perspective views as can be seen from a traditional airplane window or ship portal and one or more monitors for displaying the captured perspective view. The video system is configured to emulate a set of actual windows typically found in commercial aircraft in which passengers seated in enclosed suites or cabins can be expected to have experienced on previous flights. There is no need for passengers to focus their attention on the monitors of the video system to be provided the desired attitude reference. It is sufficient that they are subconsciously informed of changing airplane attitude through their peripheral vision.

A video system, as discussed herein, includes at least one video capture device (e.g., video camera) having a lens and an image sensor. The video capture device may have a certain aspect ratio, such as a 2:3, 4:3, or 16:9 aspect ratio. The image sensor can include, in some examples, a CCD (Charge Coupled Device) image sensor or a CMOS (Complementary Metal Oxide Semiconductor) image sensor. The image signals captured by the image sensor may be processed by an imaging signal processing unit which generates image data. The image signal processing unit can include processing circuitry for converting the image signals to digital data format. Additionally, the image signal processing unit may be configured to perform data sampling, image resolution adjustment, gain control, image balancing, gamma correction, and other image adjustment techniques. The video system may include at least one high speed data line interface and processing unit for transmitting the image data over a high speed data communications protocol. In some examples, the high speed data line interface can include a High-Definition Multimedia Interface (HDMI) data port, a High-Definition Serial Data Interface (HD-SDI) data port, or a Third Generation Serial Data Interface (3G-SDI) data port. The high speed data line interface may be wired or wireless. The image data may be communicated to the remote monitors via the at least one high speed data line interface. Alternatively or additionally, the video system may include a network interface for transmitting the data over a communications network, such as a local area network on the aircraft. The network interface may include a wired (e.g., Ethernet) or wireless connection. Further, the video system may include compression circuitry for compressing a size of the image data prior to transmission to the remote monitors.

The video system may further include a computer, computing system or processing circuitry having a controller configured to process the captured images and control display of the processed images on one or more monitors. In an example, the processing of the captured images can be based on mathematical guidance using the orientation and field of view for each image shown. In an embodiment, the displaying of the processed images can be distributed among multiple monitors based on the processing of the captured images.

Referring now to the drawings, FIG. 1 illustrates a prior art aircraft cabin with enclosed suites 20A-20D, 30A-30D. Each of the enclosed suites is accessible via a door 60. Note the blocked windows 40, 42. Passengers in suites 20A, 20D, 30A, and 30D have direct window access via windows 22A, 24A, 26A, 22D, 24D, 26D, 32A, 34A, 36A, 32D, 34D, and 36D, respectively. However, in this interior environment of FIG. 1, the passengers in enclosed suites 20B, 20C, 30B and 30C are without any visual attitude reference.

Figure 3:
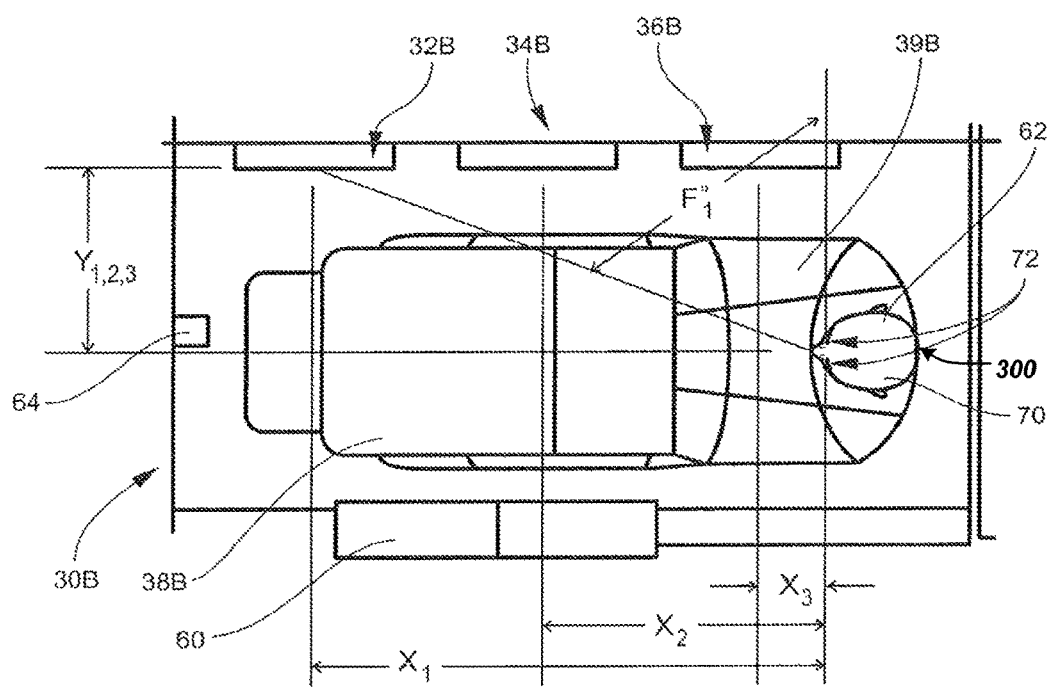
FIG. 3 is an enlarged plan view of an enclosed suite including the video system for providing attitude reference information to a seated aircraft passenger according to an example.
Figure 4:
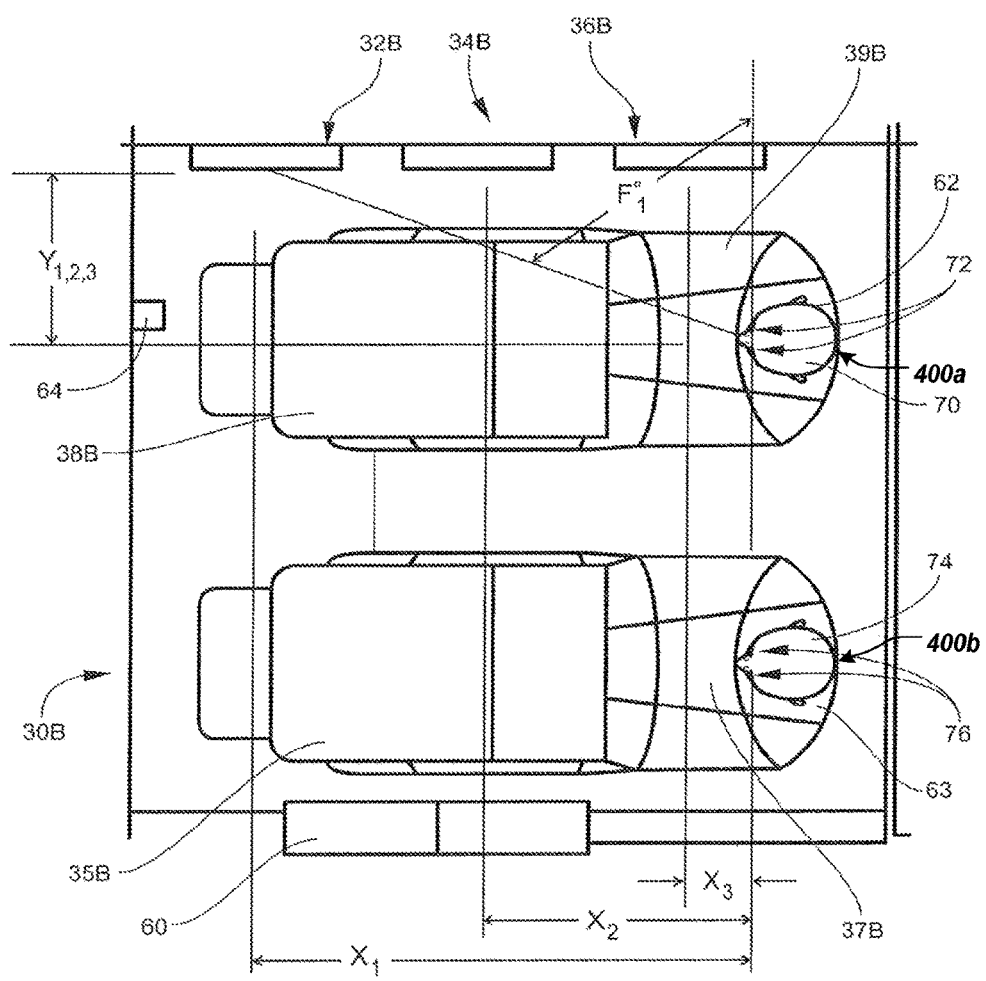
FIG. 4 is an enlarged plan view of an enclosed suite including the video system for providing attitude reference information to a pair of seated aircraft passengers according to an example.
Figure 5:
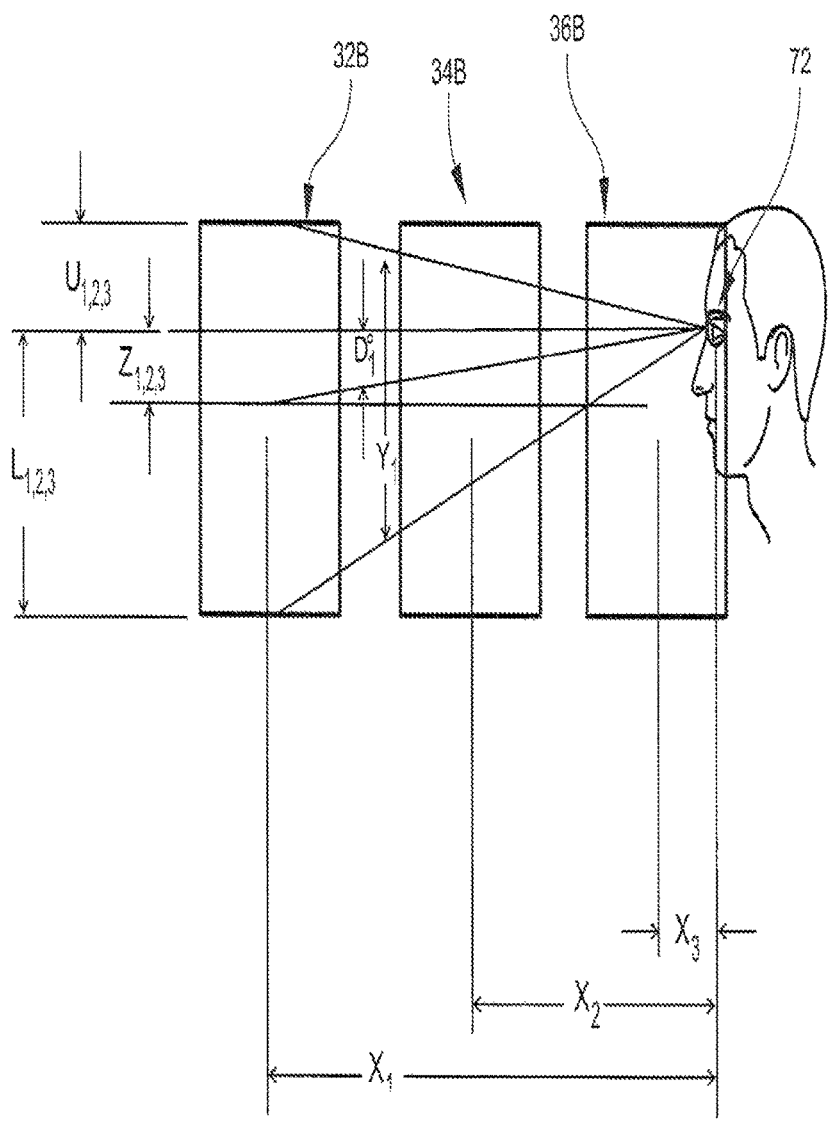
FIG. 5 is a side elevation view showing a set of monitors of the video system positioned along a wall of an enclosed suite and a set of eye elevation positions to each respective monitor according to an example.
Figure 6:
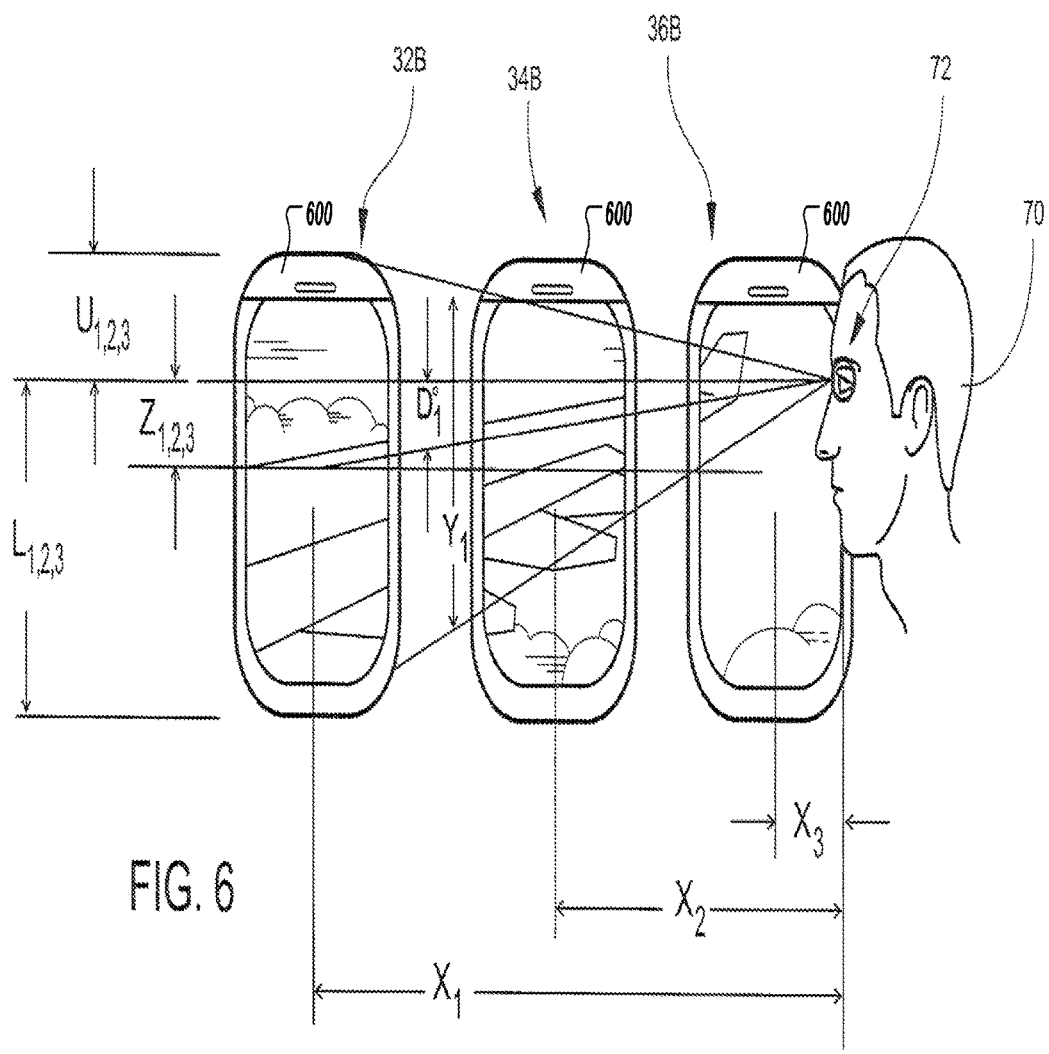
FIG. 6 is a side elevation view showing a set of virtual views displayed on each respective monitor based on the positioning of the set of monitors and the set of eye elevation positions according to an example.

In some implementations, as shown in FIGS. 2, 3, 4, 5, and 6, a video system 10 can include monitors 22B, 24B, 26B, 22C, 24C, 26C, 32B, 34B, 36B, 32C, 34C, and 36C, as indicated, for passengers seated in enclosed suites 20B, 20C, 30B, and 30C, respectively. As shown in FIGS. 5 and 6, orientations of the monitors emulate orientations of standard aircraft passenger windows. At least one monitor is adapted to serve as a virtual window mounted on the at least one interior partition in a substantially vertical and substantially parallel direction relative to a direction of forward travel of the vehicle in viewing proximity to the occupant. In an aspect, a monitor orientation takes advantage of a viewer's or passenger's 70 experience with "real" windows, such as real windows 22A, 24A, 26A, 32A, 34A, 36A, 22D, 24D, 26D, 32D, 34D, and 36D, to provide an intuitive attitude reference. Replication of this experience is depicted in FIG. 6. The monitors, 22B, 24B, 26B, 22C, 24C, 26C, 32B, 34B, 36B, 32C, 34C, and 36C, for example, may be provided to serve the single purpose of providing an external view (as shown in FIG. 6) and attitude reference. For example, to improve sense of well-being during flight it may be desirable to maintain the external view rather than using the monitors to provide informational or entertainment content. In another example, the monitors 22B, 24B, 26B, 22C, 24C, 26C, 32B, 34B, 36B, 32C, 34C, and 36C may remain on exterior view for taxi, take off, and landing modes of operation, but once the aircraft has settled into cruising position the monitor output of one or more of the monitors 22B, 24B, 26B, 22C, 24C, 26C, 32B, 34B, 36B, 32C, 34C, and 36C may be overridden by the passenger. Further to this example, in the event of turbulence of a severity causing seating of cabin attendants or discontinuance of beverage service, the monitor output may be overridden by an external system to return to the external view mode to ensure passenger comfort.

While the disclosure relates to one or more monitors 22B, 24B, 26B, 22C, 24C, 26C, 32B, 34B, 36B, 32C, 34C, and 36C, it may be appreciated that each monitor may be mounted behind a panel or frame such that a portion of the monitor is visible to the passenger. For example, one or more standard video monitors may be set behind a panel including one or more opening of approximately the size and shape of a passenger window on the exterior of the aircraft, such that the passenger views a portion of the video displayed to the monitor. The monitor, for example, may be centered behind the panel opening. The opening, for example, may be curved inwards towards the monitor as the interior cabin panel curves inwards toward each window. The panel may be designed to mimic the look and feel of the aircraft cabin walls. In other examples, the panel may be fabric, metal, or another decorative material.

To further mimic the look and feel of an exterior window, in some embodiments, each monitor 22B, 24B, 26B, 22C, 24C, 26C, 32B, 34B, 36B, 32C, 34C, and 36C includes a shade 600 for partially obscuring the view. In some embodiments, the shade is a virtual shade applied to the video feed presented upon the monitor. For example, the passenger may actuate a shade deployment control upon or remote from the monitor to set the position of a shade. In other embodiments, the shade is a physical shade, similar to the shades mounted upon the exterior windows and manually slidable to set a vertical height of shade deployment.

To provide high resolution images to each monitor, 22B, 24B, 26B, 22C, 24C, 26C, 32B, 34B, 36B, 32C, 34C, 36C, a preferred embodiment employs a video capture assembly 700 including one or more cameras located at camera position 50, 52, for each viewing angle. These cameras are positioned 50, 52 in unblocked windows 44, 46 respectively. (These windows are blocked in prior art—see FIG. 1). In cabin layouts including suite designs which naturally block one or more exterior windows on either side of the aircraft, in another example, the cameras may be positioned in windows at least partially obscured by the window-side suites. It is understood that distinct images with the desired viewing angles can be extracted electronically from a single image with a field of view wide enough to encompass the desired viewing angles. However, depending upon the type of camera used, each of these distinct images may capture such a small fraction of the original image that the resulting resolution would be poor. Additionally, digital processing of captured images may lead to undesirable latency, whereby the movement sensed by the passenger would not match the view presented upon the display, potentially leading to increased rather than decreased discomfort. For this reason, in a preferred embodiment, each monitor within the interior passenger suite may be provided video data by a separate camera.

Figure 2:
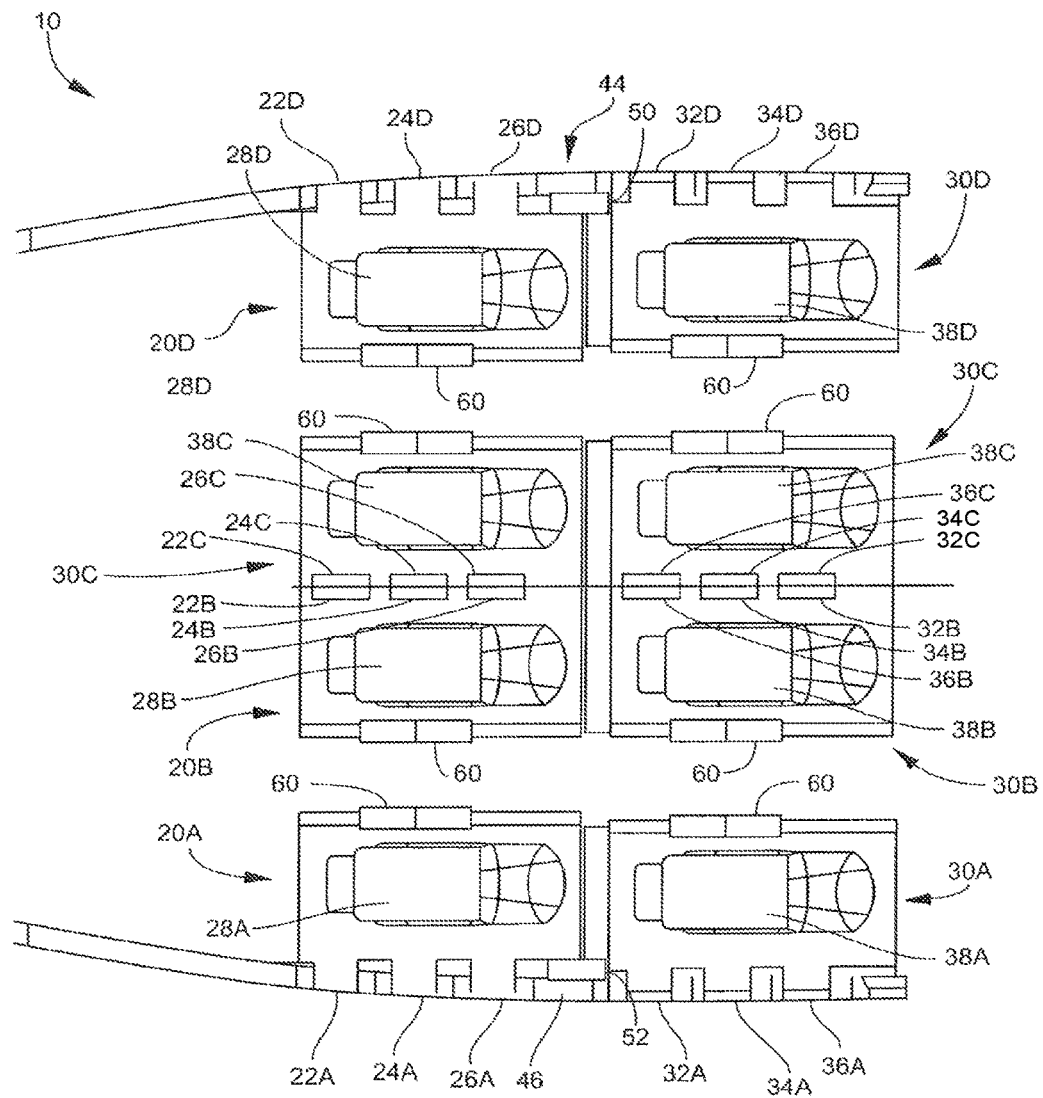
FIG. 2 is a plan view of an aircraft interior having enclosed suites including a video system for providing attitude reference information to aircraft passengers according to an example.

As shown in FIGS. 3, 4, 5 and 6, the orientation of a camera image can be D° (downward) relative to a horizontal plane and F° (forward) relative to a transverse plane according to an example. The angle values D° and F° will be different for each monitor having a different monitor position in relationship to the passenger, which can be represented as D1°, shown in FIGS. 5 and 6, and F1° shown in FIGS. 3 and 4, for the forwardmost monitor in a cabin, D2° and F2° for the second forwardmost monitor in a cabin and so forth. In FIG. 2, three individual monitors are shown in the enclosed suites 20B, 20C, 30B, 30C emulating the three standard windows provided in the suites, 20A, 20D, 30A, 30n. When the internal configurations of the enclosed suites 20B, 20C, 30B, and 30C provide the same relationship between the passenger's 70 eye position (passenger reference position 72) and monitor locations, as in the enclosed suites 20B and 30B in FIG. 2, D1°, D2°, D3°, F1°, F2° and F3° are the same for both suites and the corresponding monitors 22B, 24B, 26B, 32B, 34B, and 36B can display the same respective images. In an example, the passenger reference position 72 can be estimated based on a center position 300, 400a-b of a seat headrest. In an example, the eye position 72 is estimated based on the center position 300, 400a-b of the seat headrest and compensates for a thickness of a passenger's head.

In an aspect, the passenger can be considered as having a notional single eye position between their eyes, where: X is the forward distance from the passenger's 70 eye position to the center of the respective monitor 32B, 34B, 36B, as illustrated in FIGS. 3-6; Y is the transverse distance from the passenger's 70 eye position to the center of the respective monitor 32B, 34B, 36B, as illustrated in FIGS. 3 and 4; Z is the height of eye position above the center of the respective monitor, 32B, 34B, 36B, as illustrated in FIGS. 5 and 6; and R is the horizontal distance from the passenger's eye position to the center of the monitor, according to the formula:

$$R = \text{sqrt}(X^2 + Y^2)$$

In an example, D° in FIG. 5 can be calculated as D°=arctangent(Z/R) and F° in FIG. 3 can be calculated as F°=arctangent(X/Y).

The field of view V° in FIGS. 5 and 6, when measured as the viewing angle presented on the monitor 32B, 34B, 36B, from the upper edge of the monitor, 32B, 34B, 36B, to the lower edge of the monitor, 32B, 34B, 36B, is calculated as the sum of the angle above passenger reference position 72 height to the upper edge of the monitor, 32B, 34B, 36B, and the angle below passenger reference position 72 height to the lower edge of the monitor, 32B, 34B, 36B, where: U is the height of the upper edge of the monitor, 32B, 34B, 36B, above the passenger's eye as illustrated in FIG. 5; L is the height of the passenger reference position 72 above the lower edge of the monitor, 32B, 34B, 36B; and V° can be calculated as V°=arctangent(U/R)+arctangent(L/R).

To use simple lens assemblies, the preferred embodiment employs a different camera/lens combination for each desired field of view. However, for reasons of maximizing parts commonality, the present disclosure could employ, for all cameras in the video system, a camera/lens combination optimized for the widest field of view required and reduce the field of view of the images electronically as required. To increase the robustness, each camera may be designed as using a rigidly mounted lens with a focal length for producing the desired field of view for a monitor a particular distance from a seated passenger within the internal suite. In an example, the lens assembly can include a polarized lens to mitigate glare.

While the present disclosure is particularly well suited to a single passenger 70, it will retain some effectiveness for two passengers seated in close proximity with eye positions (passenger reference positions 72) close to one another as might be found when a couple is seated together on a double seat as shown in FIG. 4. In another example, in the event of a double occupancy suite, monitors may be mounted on either side of the suite to emulate windows on each side of the aircraft.

The view through a typical aircraft window changes in both angle and field of view with changes in the eye position of the passenger. For example, as the passenger 70 moves aft relative to a window, the view shifts to a more forward-looking view. Similarly, as the passenger 70 moves closer to a window, the field of view through the window defines a larger angle. To provide a visual reference that is consistent with the vehicle's maneuvers, a monitor, 32B, 34B, 36B, emulating a window must display an image that approximates the view the passenger 70 would see if the monitor were actually a window. For this reason both the orientation and the field of view of the camera image for the monitor, 32B, 34B, 36B, must be determined based on the passenger reference position 72 of the passenger relative to the monitor, 32B, 34B, 36B.

Accordingly, if multiple monitors, 32B, 34B, 36B, emulating the row of windows (such as 32D, 34D, 36D) commonly found in an airplane are provided to a single passenger, each of the monitors preferably present a different image, with the orientation and field of view of each of the images being determined by the passenger's 70 estimated eye position relative to that respective monitor, 32B, 34B, 36B.

According to one embodiment, the passenger's 70 passenger reference position 72 is calculated using the headrest 62 position of the passenger's seat 38B when in the upright position used during taxi takeoff and landing (TTL). This passenger reference position 72 can be calculated as the seated eye height above the seat cushion and the head length forward of the head rest 300, 400. In addition to its simplicity of execution, the present preference for this method derives from the fact that the seated passenger 70 is obliged to have the seat in the TTL position during the periods of flight when the airplane is making the maneuvers likely to cause motion sickness or discomfort.

In an additional embodiment of the present disclosure, seat position sensors including, but not limited to, a recline position sensor can be employed to estimate the passenger's eye position as passenger reference position 72 when the passenger's seat 38B is not in the TTL position.

As a yet further embodiment of the present disclosure, as shown in FIGS. 3-4, a visual system 64 that recognizes and calculates the position of facial features of the passenger 70 such as is commonly used in range-finding cameras can be used to determine the passenger reference position 72.

The foregoing explanations are not intended to limit the methods of estimating or determining the passenger reference position 72 for the present disclosure. F°, D° and V° can be calculated as described above when using these or other methods of estimating or determining the passenger reference position 72 and images to be displayed on monitors modified by either mechanical, optical or electronic means to adjust F°, D° and V° as required.

Viewing a monitor at an acute angle can distort the perceived image. As used in the present disclosure, particularly as the angle F° increases, the image as viewed can appear compressed in the horizontal axis. This horizontal distortion can be adequately corrected by expanding the image in the horizontal axis by a factor equal to 1/cosine F°. In an example, when V° is calculated as above, the horizontal distortion does not impair the passenger's 70 perception of pitch changes or roll rate from the TTL position and can be ignored. The expansion of the image in the horizontal axis to correct the horizontal distortion when viewed from the TTL position may be objectionable in the cruise mode of flight, as the passenger 70 moves forward in the suite to dine or for other activities.

In an embodiment, the video system can include a sensor configured to estimate the passenger's 70 changing eye position as passenger reference position 72 and a controller configured to adjust F°, D° and V° as required based on a mathematical correction for the horizontal distortion. In an example, the mathematical correction for the horizontal distortion can be done by expanding the image horizontally by 1/cosine F°.

Video Capture Assembly

Airplane passenger windows typically have both a dual pane window and a dust cover proximate the passenger. In an example, an existing dust cover can be removed and the window frame at least partially filled or covered by the video capture assembly 700a-c including a glare shield having one or more viewing apertures for each camera to view through. In another example, the video capture assembly 700a-c can be placed between the window pane and the dust cover. In an example, the glare shield can be made from a composite lightweight, heat-resistant material or aluminum to provide a reflective surface to avoid overheating of the cameras. The glare shield may, in some embodiments, provide physical support for mounting the camera(s). In other embodiments, the video camera(s) may be mounted on a separate mount assembly connected to the glare shield, such that the glare shield provides little or no support to the video cameras.

Although described as a single glare shield, in other embodiments, each video camera may be provided a separate glare shield.

The video capture assembly, including the video camera(s), glare shield(s), and camera mount assembly, may be physically supplied by an aircraft structure selected to maintain movement with the window pane. For example, the camera mount assembly may be configured to mount to an exterior wall of the aircraft.

In some embodiments, the video capture assembly is mounted as close as possible to the aircraft window. To reduce glare and thus reduce the size of antireflective masks upon the glare shield, for example, the video capture assembly may be mounted proximate the aircraft window.

Figures 7A, 7B, 7C:
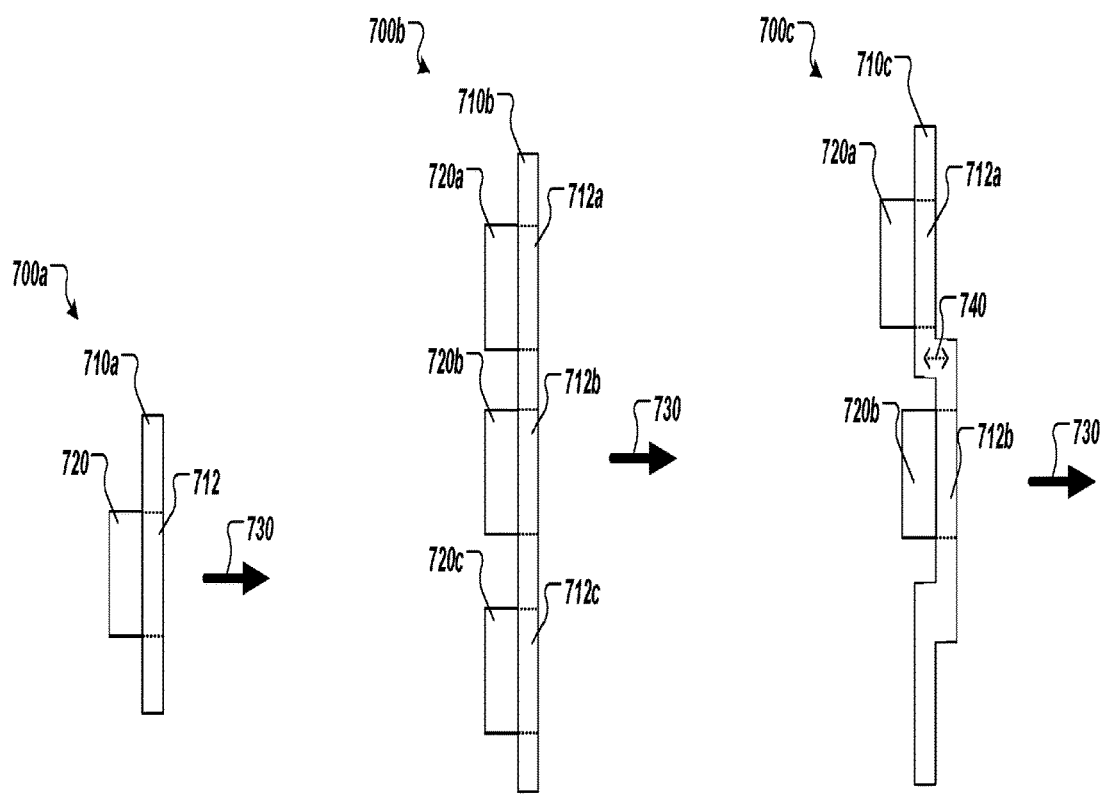
FIG. 7A is a drawing of a side view of a video capture assembly facing an exterior window, the video capture assembly including a glare shield having a viewing aperture and a camera mounted behind the glare shield at the viewing aperture according to an example.
FIG. 7B is a drawing of a side view of a video capture assembly facing an exterior window, the video capture assembly including a glare shield having a set of viewing apertures and a set of cameras, each camera mounted behind the glare shield at a respective viewing aperture according to an example.
FIG. 7C is a drawing of a side view of a video capture assembly including a glare shield having a set of viewing apertures that are offset with respect to the exterior window and a set of cameras, where each camera is mounted behind the glare shield at a respective viewing aperture according to an example.

FIG. 7A is a drawing of a side view of a video capture assembly 700a facing an exterior window 730, the video capture assembly 700a including a glare shield 710a having a viewing aperture 712 and a camera 720 mounted to the glare shield 710a at the viewing aperture 712 according to an example.

FIG. 7B is a drawing of a side view of a video capture assembly 700b facing the exterior window 730, the video capture assembly 700b including a glare shield 710b having a set of viewing apertures 712a-c and a set of cameras 720a-c, where each camera 720a-c is mounted behind the glare shield 710b at a respective viewing aperture 172a-c according to an example. In an example, the set of viewing apertures 712a-c can be configured on the glare shield 710b such that each camera 720a-c will provide a unique field of view to a respective monitor. In an example, the set of cameras 720a-c are positioned with an angular relationship based on the passenger's point of view.

In an example, the set of cameras 720a-c can include a first camera that is forward looking and is positioned uppermost on the glare shield 710b. The first camera can be relatively more acute and configured to view downward. In an example, the set of cameras 720a-c can include a second camera that is forward looking with a less acute angle and is positioned midpoint on the glare shield 710b. The second camera can be pitched downward slightly as compared to the first camera. In an example, the set of cameras 720a-c can include a third camera that is aft looking and is positioned lowermost on the glare shield 710b.

In an example, at least one camera 720a-c can be configured to point downward at a same angle relative to a transverse axis of the airplane. In an example, at least one camera 720a-c can be tilted to match a downward view directly transverse to the airplane. In an example, when the center of the window is at a seated eye height, the angles of at least one camera 720a-c can be straight out from the aircraft. In an example, each camera 720a-c can be locked at a particular angular point of view. Alternatively, at least one camera can be adjustable to have an adjustable angular point of view.

In an example, each camera 720a-c can have an aperture based on relationship between a viewpoint in the suite and the passenger reference position 72. In an aspect, the aperture can be minimally sized to prevent light from bouncing back to a lens of the camera 720a-c. In an example, each camera 720a-c can have a lens configured for a pyramidal or canal view.

In an example, a focal length of each camera 720a-c can be configured to provide a vertical angular field of view that passengers viewing the monitors will observe. In an example, the video system can be configured to create a vertical angular field of view of the passenger on a respective monitor matching a vertical height of focal length.

Binocular Vision

FIG. 7C is a drawing of a side view of a video capture assembly 700c including a glare shield 710c having a set of viewing apertures 712a-b that are offset with respect to the exterior window 730 and a set of cameras 720a-b, where each camera 720a-b is mounted behind the glare shield 710c at a respective viewing aperture 172a-b according to an example. In an example, the video capture assembly 700c can be configured for providing binocular vision to the video system. In an aspect, the video system can be configured for 3D display and the passengers can use 3D glasses to view or perceive depth of the video displayed on the monitors.

Anti-Reflection Implements

The video capture assembly 700 can be configured to subdue reflections from the exterior window 730 and re-radiated light that would otherwise reflect into a respective camera 720 in several ways. In some implementations, the video capture assembly can include a glare shield 810-880 configured to subdue reflections. In an example, an antireflective mask can be used to limit an amount of light coming into each camera. In another example, an aperture of the camera itself can be blackened out or otherwise treated with an antireflective mask to avoid reflections (not shown).

Figure 8A:
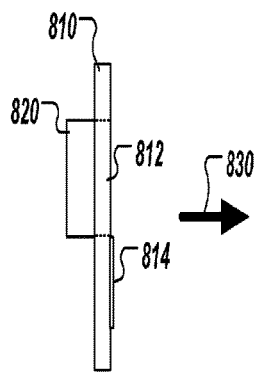
FIG. 8A is a drawing of a side view of a glare shield including an antireflective mask on at least a portion of the glare shield facing the exterior window according to an example.

FIG. 8A is a drawing of a side view of a glare shield 810 including an antireflective mask 814 on at least a portion of the glare shield 810 facing the exterior window 830 according to an example. In an example, the antireflective mask 814 can be a black matte patch adhered to or painted upon the glare shield 810. In another example, the antireflective mask 814 can be made from a rubber. In a further example, the antireflective mask 814 can be a sandblasted and anodized black region of an aluminum glare shield. In an aspect, the antireflective mask 814 can be configured to accommodate a curvature of a particular aircraft. In an example, when the outer pane is substantially flat, the antireflective mask 814 can be configured to cover a portion of the glare shield 810 based on a tilt angle and location of the window pane on a fuselage of the airplane. For example, when the window pane is located above a "belt line" of the fuselage, the window pane can be tilted farther out on a lower side. In an aspect, the antireflective mask 814 can be made from a heat resistant material. Additional aspects of the antireflective mask 814 are shown in FIGS. 9B and 10A-10C as further described below.

Figure 8B:
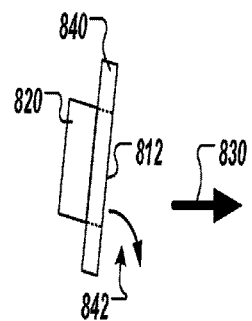
FIG. 8B is a drawing of a side view of a glare shield tilted at an acute tilt angle towards the exterior window according to an example.

In some implementations, a glare shield 840 can be configured to subdue reflections from the exterior window 830 by being tilted at a tilt angle 842, acute or obtuse, with respect to the exterior window 830 (See FIG. 8B).

Figure 8C:
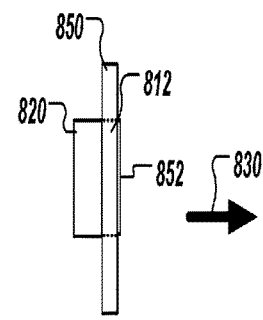
FIG. 8C is a drawing of a side view of a glare shield tilted at an obtuse tilt angle away from the exterior window according to an example.

In some implementations, a glare shield 860 can include a polarized lens configured to subdue reflections from the exterior window 830 (See FIG. 8C).

Figure 8D:
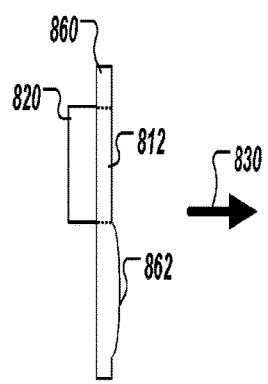
FIG. 8D is a drawing of a side view of a glare shield having a partial convex contour facing the exterior window according to an example.
Figure 8E:
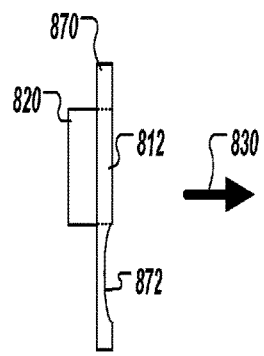
FIG. 8E is a drawing of a side view of a glare shield having a partial concave contour facing the exterior window according to an example.
Figure 8F:
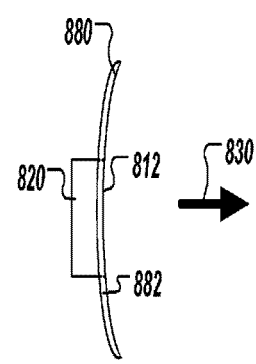
FIG. 8F is a drawing of a side view of a glare shield having a gross concave contour facing the exterior window according to an example.

In some implementations, a glare shield 860, 870 can be configured to subdue reflections from the exterior window 830 by having a partial convex contour 862 (See FIG. 8D) or a partial concave contour 872 (See FIG. 8E) adjacent to a respective viewing aperture or camera. In an example, curvatures of the partial convex contour 862 and the partial concave contour 872 can be based on a distance between the glare shield 860, 870 and the exterior window 830. In another example, a glare shield 880 can be configured to have a gross concave contour 882 with respect to the exterior window 830 (See FIG. 8F).

Figure 9A:
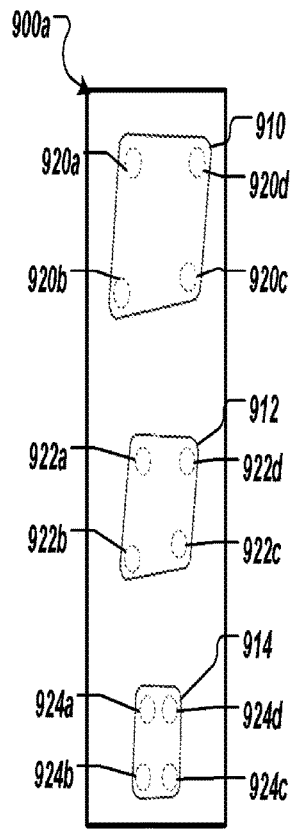
FIG. 9A is a drawing of front view of a glare shield having a set of viewing apertures, each viewing aperture having an aperture shape according to an example.

FIG. 9A is a drawing of front view of a glare shield 900a having a set of viewing apertures 910-914, each viewing aperture 910-914 having an aperture shape according to an example. In an aspect, the aperture shape can be a skewed trapezoid shape configured to enhance reduction of reflections. In an example, the aperture shape can be defined by a set of corners 920-924 and each corner can be further defined by a curvature. For example, the viewing aperture 910 can be configured to have an aperture shape defined by a set of corners 920a-d, the viewing aperture 912 can be configured to have an aperture shape defined by a set of corners 922a-d, and the viewing aperture 914 can be configured to have an aperture shape defined by a set of corners 924a-d. The corners; as illustrated, are inset from the apertures. The distance from the corners to the apertures, in one example, may be set to allow for manufacturing tolerances in manufacturing the glare shields. The aperture may move closer to the corners as manufacturing tolerances increase in accuracy.

Although the apertures 910-914 are illustrated with a particular vertical spacing and a particular horizontal spacing, the horizontal position and vertical position of each of the apertures 910-914 may be modified with little to no effect on the resultant video display. For instance, FIG. 9C is a drawing of a glare shield 900c including the set of the apertures 910-914 arranged in a different spatial configuration according to an example. The spacing, for example, may be selected to optimize reduction of reflections.

Figure 9B:
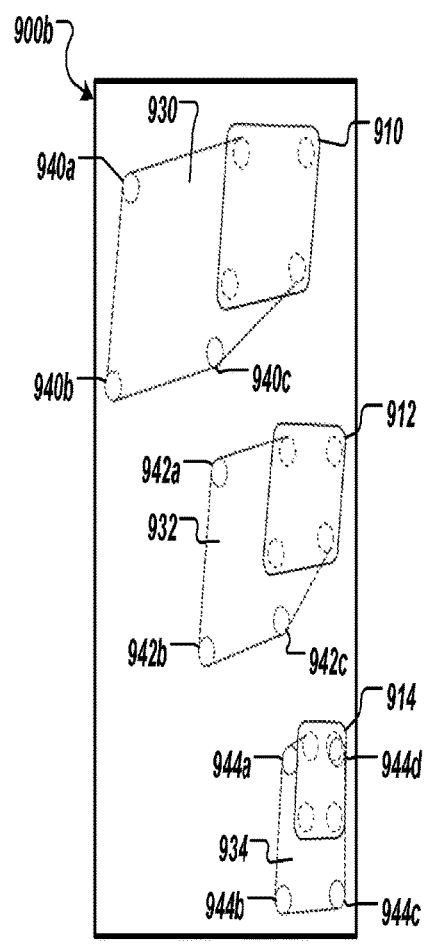
FIG. 9B is a drawing of a glare shield including the set of viewing apertures as shown in FIG. 9A, where each viewing aperture further includes a respective antireflective mask.
Figure 9C:
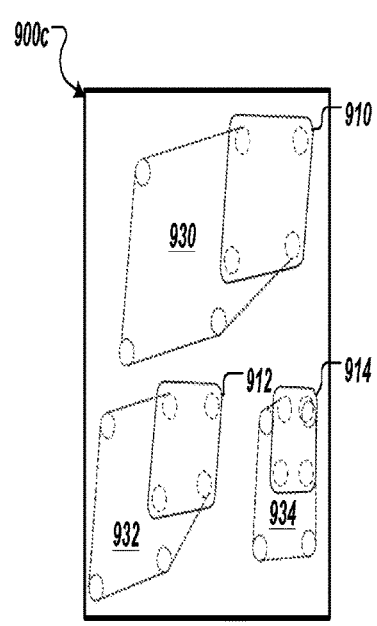
FIG. 9C is a drawing of a glare shield including the set of viewing apertures arranged in a different spatial configuration according to an example.

FIG. 9B is a drawing of a glare shield 900b including the set of viewing apertures 910-914 as shown in FIG. 9A, where each viewing aperture 910-914 further includes a respective antireflective mask 930-934. Each respective antireflective mask 930-934 can be based on a set of extensions 940-944 from the aperture shape according to an example. The set of extensions 940-944 are connected to form a perimeter of the antireflective mask 930-934 (e.g., a minimal border for applying an antireflective treatment to the glare shield 900). In an example, the set of extensions 940-944 can be based on the "F" angle (FIG. 4) as well as the downward angle D and angular field Y (FIG. 5). In an example, the set of extensions 940-944 can be based on lines tangent to the set of corners 920-924. For example, the antireflective mask 930 can be configured to have an antireflective mask shape defined by a set of extensions 940a-c, the antireflective mask 932 can be configured to have an antireflective mask shape defined by a set of extensions 942a-c, and the antireflective mask 934 can be configured to have an antireflective mask shape defined by a set of extensions 944a-d.

As discussed, the antireflective masks illustrated in FIGS. 9B and 9C are arranged to provide a minimal footprint of antireflective mask. This may be beneficial, for example, to reduce heating since matte black material causes heat. The spacing of the apertures, further, may be provided to allow for heat dissipation between the antireflective masks.

In other embodiments, the antireflective masks may be arranged in an eye-pleasing display. Since the video capture assembly may be visible from the exterior of the aircraft, the carrier may prefer to have the antireflective masks arranged to present a pattern or evoke an image. This may involve extending the minimal boundary of each antireflective mask to incorporate the artistic details. For example, the footprints of each of the antireflective masks of FIG. 9B may be extended to produce a flower petal or leaf pattern. The trade-off in presenting the antireflective masks in patterns or images would be increased heat caused by the larger regions of anti-reflective masks (e.g., matte black paint or material).

Figure 9D:
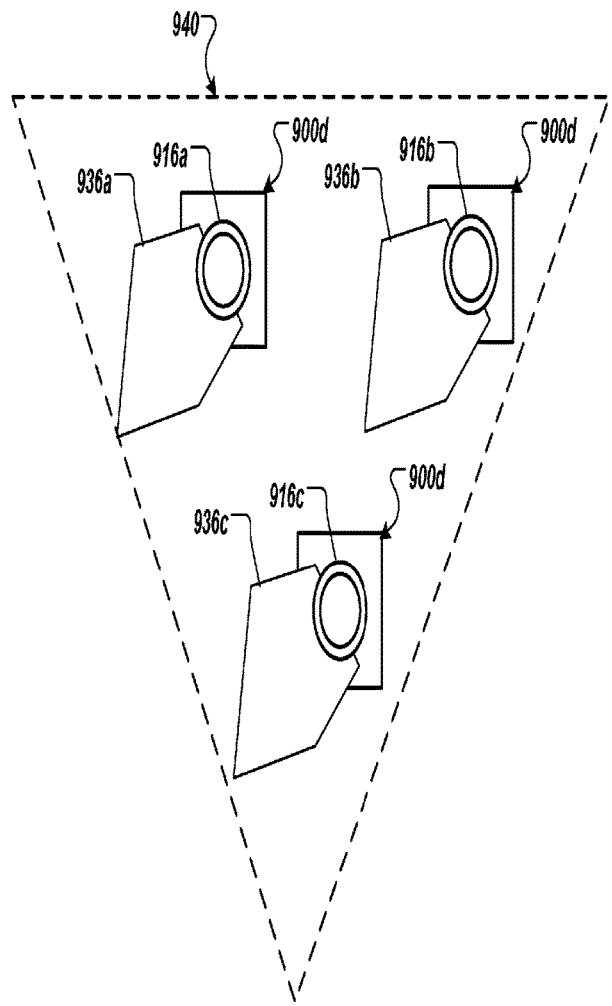
FIG. 9D is a drawing of a set of individual glare shields, each glare shield having an antireflective mask mounted to a particular camera of a video capture assembly according to an example.

FIG. 9D is a drawing of a set of individual glare shields 900d, each glare shield 900d having an antireflective mask 936a-c mounted to a particular camera 916a-c of a video capture assembly. In an example, each glare shield 900d can be positioned separately. In another example, the set of individual glare shields 900d can be configured to form an arranged spatial configuration 940.

Figure 10A:
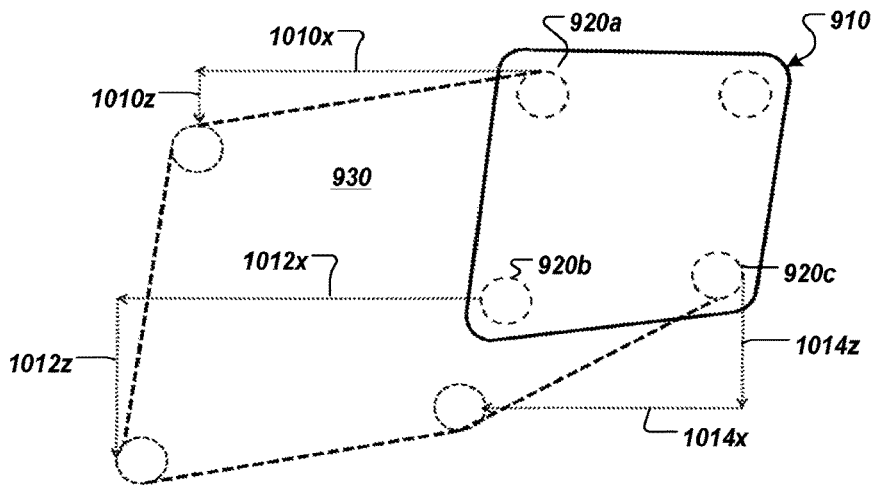
FIGS. 10A-10C are drawings of dimensions of the respective antireflective masks based on the aperture shape according to an example.
Figure 10B:
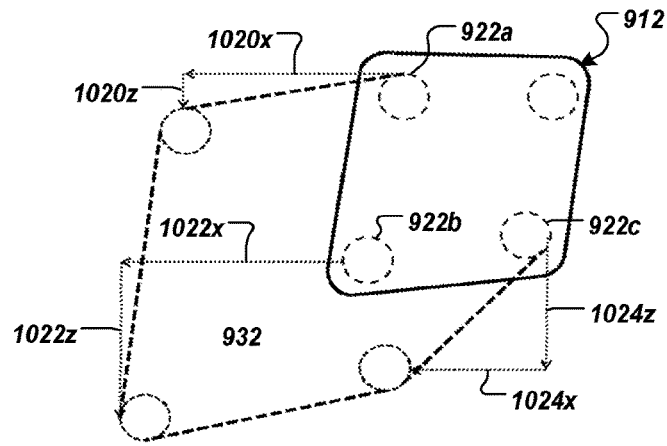
Figure 10C:
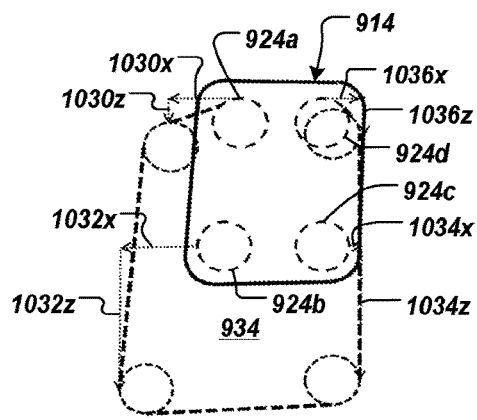
Figure 11A:
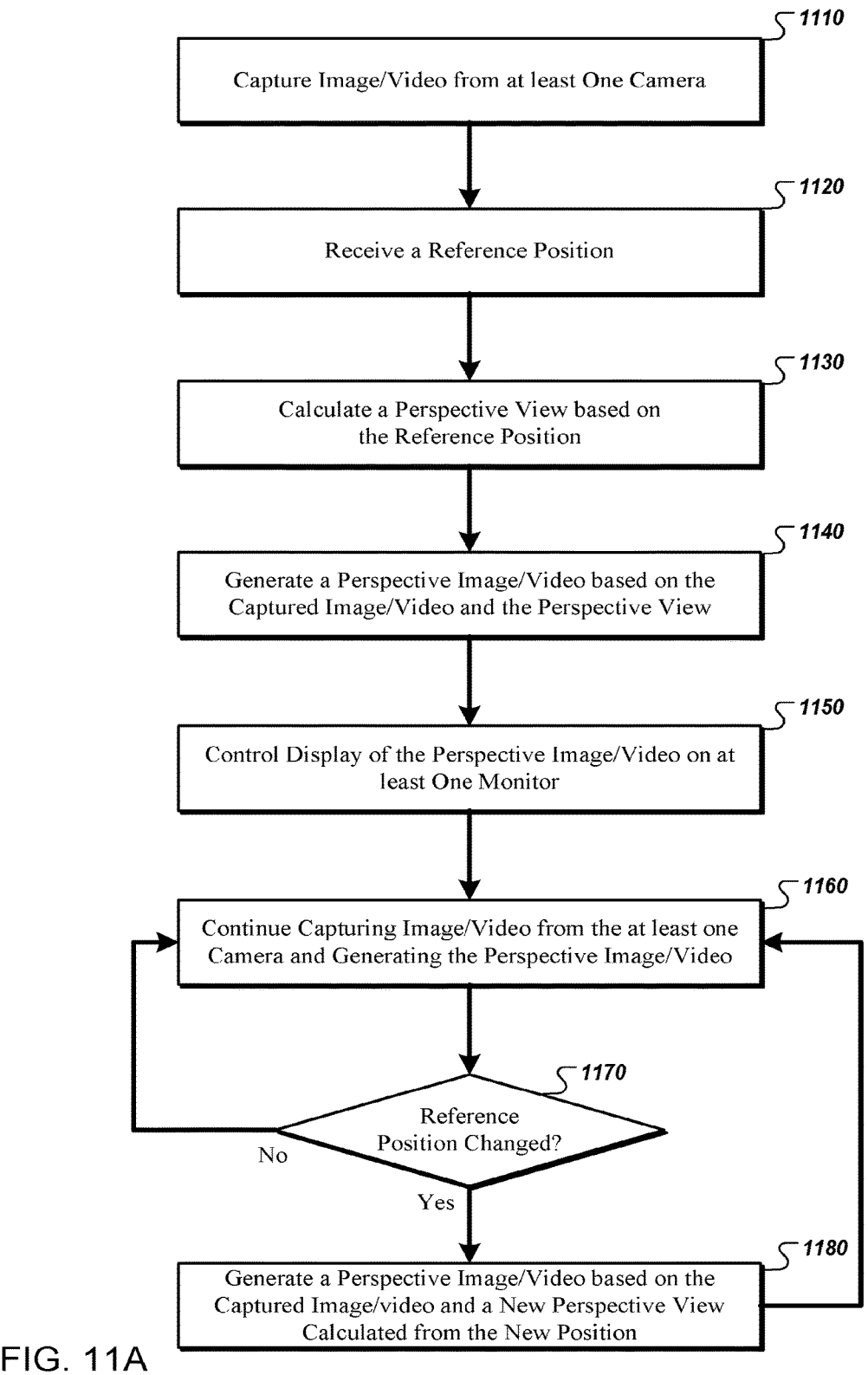
FIG. 11A is a flow chart showing a method for displaying a perspective exterior view of a vehicle within an enclosed suite.
Figure 11B:
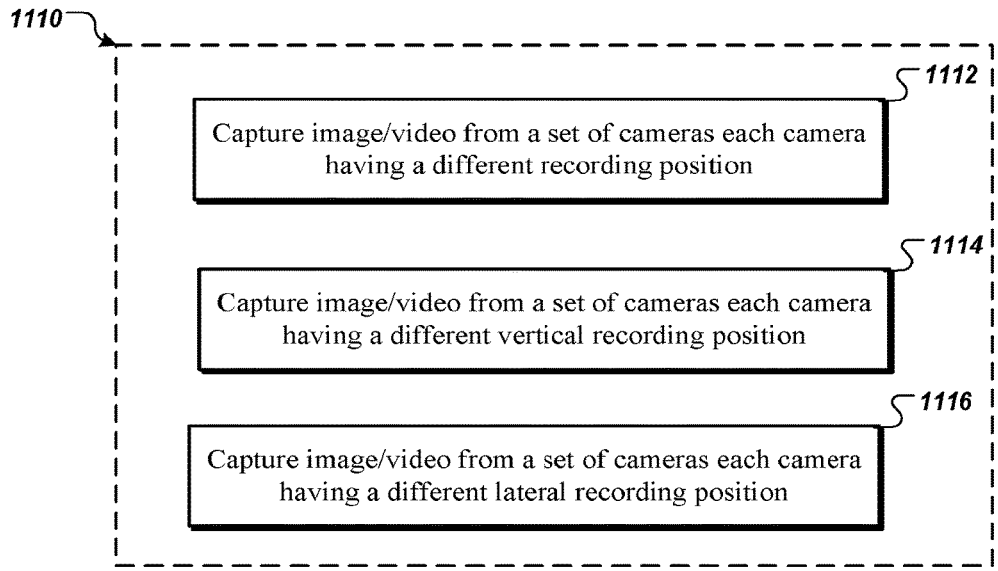
FIG. 11B shows examples of a step of capturing an image/video from at least one camera having a recording position.
Figure 11C:
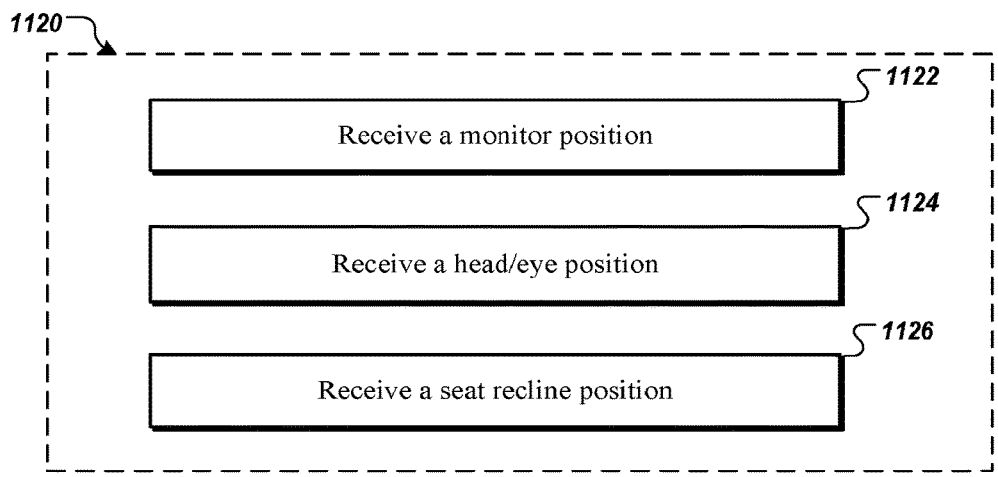
FIG. 11C shows examples of receiving a reference position.

FIGS. 10A-10C are drawings of dimensions of the respective antireflective mask 930-934 based on the aperture shape according to an example. For example, as shown in FIG. 10A, the perimeter of the antireflective mask 930 can be described by an extension 1010x in an x-direction and 1010z in a z-direction from 920a, an extension 1012x in the x-direction and 1012z in the z-direction from 920b, and an extension 1014x in the x-direction and 1014z in the z-direction from 920c. For example, as shown in FIG. 10B, the perimeter of the antireflective mask 932 can be described by an extension 1020x in an x-direction and 1020z in a z-direction from 922a, an extension 1022x in the x-direction and 1022z in the z-direction from 922b, and an extension 1024x in the x-direction and 1024z in the z-direction from 922c. For example, as shown in FIG. 10C, the perimeter of the antireflective mask 934 can be described by an extension 1030x in an x-direction and 1030z in a z-direction from 924a, an extension 1032x in the x-direction and 1032z in the z-direction from 924b, and an extension 1034x in the x-direction and 1034z in the z-direction from 924c. In an aspect, dimensions of each antireflective mask can be minimized to avoid increased heat absorption.

Display Method

A method 1100 is provided for displaying a perspective exterior view of a vehicle within an enclosed suite. The method 1100 can be performed by a series of steps according to an example.

In some implementations, an image/video is captured from at least one camera (1110). In an example, capturing the image/video can include capturing image/video from a set of cameras each camera having a different recording position (1112). In another example, capturing the image/video can include capturing image/video from a set of cameras each camera having a different vertical recording position (1114). In another example, capturing the image/video can include capturing image/video from a set of cameras each camera having a different lateral recording position (1116). In an example, the different lateral recording position can be configured for generating a 3D image/video.

In some implementations, a reference position is received at the controller (1120). Examples of receiving a reference position include receiving a monitor position of a monitor (1122), receiving a head or eye position of a passenger (1124), and receiving a seat recline position (1126). In an example, receiving a monitor position of a monitor (1122) can be done by programming and looking up the monitor position in a look up table stored in memory. In an embodiment a passenger reference position can be received from a sensor as described above. In a further example, the passenger reference position may be a set value determined based on the head rest position.

In some implementations, a perspective view is calculated based on the passenger reference position (1130). In an example, the perspective view can be calculated based on the field of view V° as described in FIGS. 5 and 6.

In some implementations, a perspective image/video is generated based on the captured image/video and the perspective view (1140). In an example, the perspective image/video can be generated by applying the horizontal distortion correction using the controller.

In some implementations display of the perspective image/video on at least one monitor is controlled (1150). In an example, controlling display can include controlling display of the perspective image on an additional monitor, where each additional monitor has a different monitor position. Each camera of two or more cameras, for example, may be angled in accordance of an appropriate view for each monitor of two or more monitors. Controlling the display may include presenting the image/video captured by the appropriate camera to the appropriate monitor.

The method 1100, in some implementations, continues with capturing image or video data from the at least one camera and generating the perspective image/video for display on the at least one monitor (1160).

In some implementations, the passenger reference position may change during image/video capture and display (1170). In some examples, a parent may switch seats with a child, resulting in a much lower head position, or a passenger may recline the passenger seat. In the event that a position sensor identifies substantial displacement of the passenger's head position or movement of the passenger seat into the reclined position, the movement may result in a new reference position (e.g., such as the reference position described in relation to step 1120).

In some implementations, a perspective image/video is generated based on the captured image/video and a new perspective view calculated from the new position (1180). The perspective view, in some embodiments, is adjusted digitally. For example, images captured by the at least one camera may be filtered to a new perspective view. In other embodiments, the perspective view is adjusted by switching to different camera(s). In another example, a first camera or set of cameras may be mounted to provide an appropriate display when the passenger is in the upright position, while a second camera or set of cameras may be mounted to provide an appropriate display when the passenger is in a reclined position.

Upon setting the new perspective view, image/video may continue to be captured and video generated and displayed as described above (1160).

ADDITIONAL FEATURES

In some implementations, the video system can be configured to filter blue light displayed on the monitors. Blue light is known to activate cells in the eye that can affect alertness. Compared to viewing from an actual window, the video system configured to filter blue light can aid the passenger in preparing to sleep.

In some implementations, the video system can be configured to selectively display views from an opposite side of the airplane. For instance, a video system positioned on a right side of the airplane can be overridden to display a view from a video system positioned on a left side of the airplane. This feature can be useful in instances when the flight crew identifies landmarks that can be viewed from an actual window on a particular side of the airplane. For example, the airline captain or crew may briefly override the image feed to display a landmark such as the Grand Canyon to the passenger.

The foregoing detailed description of the innovations included herein is not intended to be limited to any specific figure or described embodiment. One of ordinary skill would readily envision numerous modifications and variations of the foregoing examples, and the scope of the present disclosure is intended to encompass all such modifications and variations. Accordingly, the scope of the claims presented is properly measured by the words of the appended claims using their ordinary meanings, consistent with the descriptions and depictions herein.

What is claimed is:

1. A system, comprising:
   at least one monitor mounted on a wall panel within an interior of an aircraft, each of the at least one monitor configured to mimic an aircraft window, wherein each of the at least one monitor includes a shade feature; and
   a video capture assembly comprising at least one camera configured for mounting proximate at least one aircraft window,
   wherein each monitor of the at least one monitor comprises a respective monitor position relative to a passenger seat, wherein each monitor corresponds to a particular camera of the at least one camera,
   wherein each camera of the at least one camera is angled to capture image data at a respective perspective view determined based in part upon a distance between a monitor position of a respective monitor of the at least one monitor and a passenger reference position corresponding to an estimated view point of a passenger while seated in the passenger seat,
   wherein the video capture assembly is configured for mounting in a position between a dual glass pane of the at least one aircraft window and a dust cover of the at least one aircraft window.

2. The system of claim 1, wherein the shade feature is configured to mimic a manually slidable aircraft window shade.

3. The system of claim 1, wherein the shade feature is a virtual shade.

4. The system of claim 1, wherein the shade feature is a physical shade.

5. The system of claim 1, wherein the at least one monitor comprises at least two monitors.

6. The system of claim 1, wherein the at least one monitor is mounted in a passenger suite.

7. The system of claim 1, wherein the wall panel is substantially parallel to a direction of flight.

8. The system of claim 1, wherein the at least one camera comprises at least two cameras.

9. The system of claim 1, wherein one or more of the at least one camera is mounted proximate an obstructed window.

10. The system of claim 1, wherein one or more of the at least one camera is mounted proximate an unblocked window.

11. The system of claim 1, wherein the passenger reference position is a default position based upon a position of a headrest of the passenger seat when the passenger seat is in a position required for taxi, takeoff, and landing.

12. The system of claim 1, further comprising a sensor configured to detect a passenger position.

13. The system of claim 1, wherein the video capture assembly comprises a glare shield including a respective viewing aperture for each camera of the at least one camera, wherein each camera of the at least one camera is mounted behind the glare shield to capture image data of scenery visible through the aircraft window.

14. The system of claim 13, wherein the glare shield comprises a respective anti-reflective mask for each camera of the at least one camera.

15. A system, comprising:
    at least one monitor mounted on a wall panel within an interior of an aircraft, each of the at least one monitor configured to mimic an aircraft window, wherein each of the at least one monitor includes a shade feature configured to mimic a manually slidable aircraft window shade, wherein the shade feature is a virtual shade; and a video capture assembly comprising at least one camera configured for mounting proximate at least one aircraft window, wherein each monitor of the at least one monitor comprises a respective monitor position relative to a passenger seat, wherein each monitor corresponds to a particular camera of the at least one camera, wherein each camera of the at least one camera is angled to capture image data at a respective perspective view determined based in part upon a distance between a monitor position of a respective monitor of the at least one monitor and a passenger reference position corresponding to an estimated view point of a passenger while seated in the passenger seat, wherein the video capture assembly is configured for mounting in a position between a dual glass pane of the at least one aircraft window and a dust cover of the at least one aircraft window.

16. A system, comprising:

at least one monitor mounted on a wall panel within an interior of an aircraft, each of the at least one monitor configured to mimic an aircraft window, wherein each of the at least one monitor includes a shade feature configured to mimic a manually slidable aircraft window shade, wherein the shade feature is a physical shade; and a video capture assembly comprising at least one camera configured for mounting proximate at least one aircraft window, wherein each monitor of the at least one monitor comprises a respective monitor position relative to a passenger seat, wherein each monitor corresponds to a particular camera of the at least one camera, wherein each camera of the at least one camera is angled to capture image data at a respective perspective view determined based in part upon a distance between a monitor position of a respective monitor of the at least one monitor and a passenger reference position corresponding to an estimated view point of a passenger while seated in the passenger seat, wherein the video capture assembly is configured for mounting in a position between a dual glass pane of the at least one aircraft window and a dust cover of the at least one aircraft window.

* * * * *